US012624316B2

(12) United States Patent
Joos et al.

(10) Patent No.: US 12,624,316 B2
(45) Date of Patent: May 12, 2026

(54) TREATMENT COMPOSITION WITH DELIVERY PARTICLES MADE FROM ACID-TREATED CHITOSAN

(71) Applicant: The Procter & Gamble Company, Cincinnati, OH (US)

(72) Inventors: Conny Erna Alice Joos, Buggenhout (BE); Johan Smets, Lubbeek (BE); Ariel Lebron, Cincinnati, OH (US); Jennifer Beth Allison, Cincinnati, OH (US); Mattia Collu, Saint-Gilles (BE); Susana Fernandez Prieto, Benicarlo (ES); Olav Pieter Dora Tony Keijzer, Ltterbeek (BE); Linsheng Feng, Menasha, WI (US); Sonia Marcela Malagon Gomez, Appleton, WI (US); Meagan Marie Kochel, Appleton, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 349 days.

(21) Appl. No.: 18/522,458

(22) Filed: Nov. 29, 2023

(65) Prior Publication Data
US 2024/0182823 A1     Jun. 6, 2024

Related U.S. Application Data

(60) Provisional application No. 63/429,191, filed on Dec. 1, 2022.

(51) Int. Cl.
| | |
|---|---|
| *C11D 17/00* | (2006.01) |
| *B01J 13/16* | (2006.01) |
| *C11D 3/00* | (2006.01) |
| *C11D 3/22* | (2006.01) |
| *C11D 3/50* | (2006.01) |

(52) U.S. Cl.
CPC .............. *C11D 3/505* (2013.01); *B01J 13/16* (2013.01); *C11D 3/0073* (2013.01); *C11D 3/223* (2013.01); *C11D 17/0013* (2013.01); *C11D 17/0039* (2013.01); *C11D 2111/12* (2024.01)

(58) Field of Classification Search
None
See application file for complete search history.

(56) References Cited

U.S. PATENT DOCUMENTS

| | | | |
|---|---|---|---|
| 4,138,362 | A | 2/1979 | Vassiliades et al. |
| 5,489,401 | A | 2/1996 | Freeman |
| 6,159,918 | A | 12/2000 | Bae-Lee et al. |
| 6,630,437 | B1 | 10/2003 | Murphy et al. |
| 6,632,783 | B1 | 10/2003 | Giblin et al. |
| 6,797,670 | B2 | 9/2004 | Kleban et al. |
| 8,546,509 | B2 | 10/2013 | Kulke et al. |
| 10,085,925 | B2 | 10/2018 | Lei et al. |
| 10,398,632 | B2 | 9/2019 | Aussant et al. |
| 11,382,845 | B2 | 7/2022 | Bulgarelli |
| 2005/0047990 | A1 | 3/2005 | Rees et al. |
| 2005/0047991 | A1 | 3/2005 | Rees et al. |
| 2008/0118568 | A1 | 5/2008 | Smets et al. |
| 2011/0071064 | A1 | 3/2011 | Lei et al. |
| 2013/0330292 | A1 | 12/2013 | Lei et al. |
| 2015/0252312 | A1 | 9/2015 | De Villeneuve |
| 2016/0158121 | A1 | 6/2016 | Lei et al. |
| 2017/0121649 | A1 | 5/2017 | Shi et al. |
| 2017/0360676 | A1 | 12/2017 | Dihora et al. |
| 2017/0362543 | A1 | 12/2017 | Shen |
| 2018/0015009 | A1 | 1/2018 | Soubiran et al. |
| 2018/0265827 | A1 | 9/2018 | Oh et al. |
| 2019/0054440 | A1 | 2/2019 | Mistry |
| 2019/0184364 | A1 | 6/2019 | Brahms et al. |
| 2020/0222873 | A1 | 7/2020 | Neuman et al. |
| 2021/0237021 | A1 | 8/2021 | Akeroyd et al. |
| 2021/0252469 | A1 | 8/2021 | Feng |
| 2021/0339217 | A1 | 11/2021 | Feng |
| 2022/0071863 | A1 | 3/2022 | Xu et al. |
| 2022/0071865 | A1 | 3/2022 | Sasaki et al. |
| 2022/0125700 | A1 | 4/2022 | Lei et al. |
| 2022/0152572 | A1 | 5/2022 | Fernandez Prieto et al. |
| 2022/0161219 | A1* | 5/2022 | Fernandez Prieto ........................ C11D 3/3757 |
| 2022/0177815 | A1 | 6/2022 | Popplewell |
| 2023/0049775 | A1* | 2/2023 | Feng ........................ A61K 8/65 |

(Continued)

FOREIGN PATENT DOCUMENTS

| | | |
|---|---|---|
| CN | 103012815 A | 4/2013 |
| EP | 2832441 A1 | 2/2015 |

(Continued)

OTHER PUBLICATIONS

4 Types of Random Sampling Techniques Explained, Retrieved from Internet: https://web.archive.org/web/20221219170517/https://builtin.com/data-science/types-of-random-sampling, Dec. 16, 2022, 6 pages.
"Chitosan suppliers & manufacturers in China", Retrieved from Internet: https://web.archive.org/web/20220808071033/https://www.chemicalbookcom/ProdSupplierGNCB1479274_EN.htm, Aug. 8, 2022, 4 pages.
PCT Search Report and Written Opinion for PCT/US2023/081533 dated Mar. 12, 2024, 11 pages.
All Office Actions; U.S. Appl. No. 18/522,382, filed Nov. 29, 2023.
All Office Actions; U.S. Appl. No. 18/522,424, filed Nov. 29, 2023.
All Office Actions; U.S. Appl. No. 18/522,443, filed Nov. 29, 2023.
All Office Actions; U.S. Appl. No. 18/522,451, filed Nov. 29, 2023.

(Continued)

*Primary Examiner* — Lorna M Douyon
(74) *Attorney, Agent, or Firm* — Carolyn S. Powell; Andrew J. Mueller

(57) ABSTRACT

A treatment composition that includes a treatment adjunct and a population of core/shell delivery particles, where the shell is made from an acid-treated chitosan and a cross-linking agent, where the acid-treated chitosan results from treating chitosan with a weak acid, or even a mixture of a strong acid and a weak acid. Related methods of making and using such compositions.

14 Claims, No Drawings

(56) References Cited

U.S. PATENT DOCUMENTS

| | | | | |
|---|---|---|---|---|
| 2023/0061781 A1* | 3/2023 | Fernandez-Prieto | ........................ D06M 23/12 | |
| 2023/0062702 A1* | 3/2023 | Fernandez-Prieto | .... C11D 3/30 | |
| 2024/0017234 A1* | 1/2024 | Muñoz | ................ A61K 8/8158 | |
| 2024/0148617 A1 | 5/2024 | Valmacco | | |

FOREIGN PATENT DOCUMENTS

| | | | |
|---|---|---|---|
| KR | 100523479 | B1 | 10/2005 |
| WO | 2011154893 | A1 | 12/2011 |
| WO | 2012044263 | A2 | 4/2012 |
| WO | 2015023961 | A1 | 2/2015 |
| WO | 2016071149 | A1 | 5/2016 |
| WO | 2017148504 | A1 | 9/2017 |
| WO | 2017218880 | A1 | 12/2017 |
| WO | 2018053356 | A1 | 3/2018 |
| WO | 2018183150 | A1 | 10/2018 |
| WO | 2019063515 | A1 | 4/2019 |
| WO | 2019171929 | A1 | 9/2019 |
| WO | 2019171959 | A1 | 9/2019 |
| WO | 2019179939 | A1 | 9/2019 |
| WO | 2019181668 | A1 | 9/2019 |
| WO | 2019181682 | A1 | 9/2019 |
| WO | 2019185553 | A1 | 10/2019 |
| WO | 2019210125 | A1 | 10/2019 |
| WO | 2020058044 | A1 | 3/2020 |
| WO | 2020194910 | A1 | 10/2020 |
| WO | 2020195132 | A1 | 10/2020 |
| WO | 2020209907 | A1 | 10/2020 |
| WO | 2020209908 | A1 | 10/2020 |
| WO | 2020209909 | A1 | 10/2020 |
| WO | 2021018947 | A1 | 2/2021 |
| WO | 2021091046 | A1 | 5/2021 |
| WO | 2021116306 | A1 | 6/2021 |
| WO | 2021163599 | A1 | 8/2021 |
| WO | WO 2021/161107 | A2 | 8/2021 |
| WO | 2022109079 | A1 | 5/2022 |
| WO | 2022109127 | A1 | 5/2022 |
| WO | 2022207538 | A1 | 10/2022 |
| WO | 2023019187 | A1 | 2/2023 |
| WO | 2023019219 | A1 | 2/2023 |

OTHER PUBLICATIONS

All Office Actions; U.S. Appl. No. 18/522,477, filed Nov. 29, 2023.

Gincy Marina Mathew et al. "Chitosan Derivatives: Properties and Applications" vol. 7, No Known Date, pp. 135-161.

Gregorio Crini et al, "Sustainable Agriculture Reviews 35" vol. 35, 2019, pp. 338.

Jose Alexandre Borges Valle et al. "Chitosan microcapsules: Methods of the production and use in the textile finishing" vol. 138, 2021, pp. 29.

Kathleen McDonough et al. "Assessing the biodegradability of microparticles disposed down the drain", vol. 175, Feb. 20, 2017, pp. 452-458.

Lowell H. Hall et al. "The Electrotopological State: An Atom Index for QSAR" vol. 10, 1991, pp. 43-51.

Manuel Jose Lis Arias et al. "Influence of Chitosan Characteristics in the Microencapsulation of Essential Oils" vol. 14, 2021, pp. 119-129.

Shih-Chang Hsu et al. "Free radical degradation of chitosan with potassium persulfate" vol. 75, 2002, pp. 73-83.

Unpublished U.S. Appl. No. 18/522,382, filed Nov. 29, 2023, to Mattia Collu et al.

Unpublished U.S. Appl. No. 18/522,424, filed Nov. 29, 2023, to Ariel Lebron et al.

Unpublished U.S. Appl. No. 18/522,443, filed Nov. 29, 2023, to Amanda Kiser Jukes et al.

Unpublished U.S. Appl. No. 18/522,451, filed Nov. 29, 2023, to Johan Smets et al.

Unpublished U.S. Appl. No. 18/522,477, filed Nov. 29, 2023, to Susana Fernandez Prieto et al.

* cited by examiner

TREATMENT COMPOSITION WITH DELIVERY PARTICLES MADE FROM ACID-TREATED CHITOSAN

FIELD OF THE INVENTION

The present disclosure relates to a treatment composition that includes a treatment adjunct and a population of core/shell delivery particles, where the shell is made from an acid-treated chitosan and a cross-linking agent, where the acid-treated chitosan results from treating chitosan with a weak acid, or even with a mixture of a strong acid and a weak acid. The present disclosure also relates to related methods of making and using such compositions.

BACKGROUND OF THE INVENTION

Delivery particles, particularly core/shell delivery particles, are a convenient way to delivery benefit agents in treatment compositions such as laundry products. For environmental reasons, it may be desirable to use delivery particles that have a wall made from naturally-derived and/or biodegradeable materials.

Delivery particles having a shell made at least in part from chitosan-based materials are known. However, such particles may not deliver the desired level of performance. Furthermore, chitosan can be a challenging material to work with due to its viscosity-building tendencies.

U.S. Patent Publication 2021/0252469 discloses treatment of chitosan in an acidic medium prior to the formation of microcapsules, for example by adjusting the pH with hydrochloric acid (HCl). However, there are challenges associated with such treatment methods. For example, under certain conditions, hydrochloric acid can be corrosive to manufacturing equipment, which is typically made of steel. Additionally or alternatively, improvements in the performance of delivery particles are still desired.

There is a need for improved treatment compositions that include delivery particles made from chitosan-based materials, as well as related methods.

SUMMARY OF THE INVENTION

The present disclosure relates to treatment compositions that include chitosan-based core/shell delivery particles, where the chitosan is treated by a weak acid, or even a mixture of a strong acid and a weak acid. For example, the present disclosure relates to a treatment composition that includes a treatment adjunct and a population of delivery particles, where the delivery particles include a core and shell surrounding the core, where the core includes a benefit agent, where the shell includes a polymeric material that is the reaction product of chitosan and a cross-linking agent, where the acid-treated chitosan results from treating chitosan with a mixture of a first acid and a second acid, the first acid comprising a strong acid, the second acid comprising a weak acid, where the first acid and the second acid are present in a normality ratio of from about 20:80 to about 80:20, preferably from about 35:65 to about 65:35, wherein the chitosan is treated with the mixture at a pH of 6.5 or less, and at a temperature of at least 25° C.

The present disclosure also relates to a treatment composition that includes a treatment adjunct and a population of delivery particles, where the delivery particles include a core and shell surrounding the core, where the core includes a benefit agent, where the shell includes a polymeric material that is the reaction product of an acid-treated chitosan and a cross-linking agent, wherein the acid-treated chitosan results from treating chitosan with an acid, where the acid includes one or more weak acids, where the chitosan is treated with the acid at a pH of 6.5 or less, and at a temperature of at least 25° C.; and where the treatment adjunct includes a conditioning active.

The present disclosure also relates to a method of making a treatment composition, where the method includes the steps of: providing a base composition, wherein the base composition comprises a treatment adjunct, and combining the population of delivery particles with the base composition.

The present disclosure also relates to a method of treating a surface, where the method includes the step of: contacting a surface, preferably a fabric, with a treatment composition as described herein.

DETAILED DESCRIPTION OF THE INVENTION

The present disclosure relates to treatment compositions that include delivery particles having shells made, at least in part, from chitosan-based materials. In particular, the delivery particles include a shell comprising a reaction product of chitosan and a cross-linking agent. Prior to shell formation, the chitosan used to make the particle shells is treated with a weak acid, or even a mixture of acids, namely a mixture comprising a strong acid and a weak acid.

Typically, when chitosan is dissolved in water, for example during the process of making delivery particles, the resulting mixture tends to be quite viscous. This can result in flowability and processing challenges, and/or inhibit the adequate formation of delivery particle shells. It has been found that the acid treatment can result in a decrease of the mixture's viscosity. Additionally, it is believed that acid treating the chitosan can beneficially affect the molecular weight of the chitosan, thereby leading to improved shell formation and/or delivery performance.

That being said, even when the chitosan is treated at a consistent pH, it has been found that the choice of acid can make a difference. For example, using a strong acid, such as HCl, alone may result is relatively suitable particles, but can result in potential corrosivity issues in the manufacturing plant.

It has surprisingly been found that treating chitosan with a weak acid, or even an acid mixture that comprises a weak acid, can result in suitable delivery particles while reducing the corrosion challenges to manufacturing equipment. It has even surprisingly been found that the careful selection of acid (or rather, acids) can provide benefits in one or more vectors. For example, it is believed that by treating chitosan with a mixed-acid system that comprises a strong acid and a weak acid, particularly in certain ratios, results in well-performing delivery particles while reducing corrosion risks in the manufacturing plant.

The acid-treated chitosan, delivery particles, treatment compositions, and related methods of the present disclosure are discussed in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein "consumer product," means baby care, beauty care, fabric & home care, family care, feminine care, and/or health care products or devices intended to be used or consumed in the form in which it is sold, and not intended for subsequent commercial manufacture or modification. Such products include but are not limited to diapers, bibs, wipes; products for and/or methods relating to treating human hair, including bleaching, coloring, dyeing, conditioning, shampooing, styling; deodorants and antiperspirants; personal cleansing; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels;

tampons, feminine napkins; adult incontinence products; products and/or methods relating to oral care including toothpastes, tooth gels, tooth rinses, denture adhesives, tooth whitening; over-the-counter health care including cough and cold remedies; pest control products; and water purification.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, "delivery particles," "particles," "encapsulates," "microcapsules," and "capsules" are used interchangeably, unless indicated otherwise. As used herein, these terms typically refer to core/shell delivery particles.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (C) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Treatment Composition

The present disclosure relates to treatment compositions (or simply "compositions" as used herein). The compositions of the present disclosure may comprise a population of delivery particles and a treatment adjunct, each described in more detail below. The treatment compositions may be useful in the methods of treating surfaces, such as fabrics, described herein.

The treatment composition is preferably a consumer product composition. The consumer products compositions of the present disclosure may be useful in baby care, beauty care, fabric care, home care, family care, feminine care, and/or health care applications. The consumer product compositions may be useful for treating a surface, such as fabric, hair, or skin. The consumer product compositions may be intended to be used or consumed in the form in which it is sold. The consumer product compositions of the present disclosure are typically not intended for subsequent commercial manufacture or modification.

The consumer product composition may preferably be a fabric care composition, a hard surface cleaner composition, a dish care composition, a hair care composition (such as shampoo or conditioner), a body cleansing composition, or a mixture thereof, preferably a fabric care composition.

The consumer product composition may be a fabric care composition, such as a laundry detergent composition (including a heavy-duty liquid washing detergent or a unit dose article), a fabric conditioning composition (including a liquid fabric softening and/or enhancing composition), a laundry additive, a fabric pre-treat composition (including a spray, a pourable liquid, or a spray), a fabric refresher composition (including a spray), or a mixture thereof. The treatment composition is preferably a fabric conditioning composition, even more preferably a liquid fabric conditioning composition.

The composition may be a beauty care composition, such as a hair treatment product (including shampoo and/or conditioner), a skin care product (including a cream, lotion, or other topically applied product for consumer use), a shave care product (including a shaving lotion, foam, or pre- or post-shave treatment), personal cleansing product (including a liquid body wash, a liquid hand soap, and/or a bar soap), a deodorant and/or antiperspirant, or mixtures thereof.

The composition may be a home care composition, such as an air care, car care, dishwashing, hard surface cleaning and/or treatment, and other cleaning for consumer or institutional use.

The treatment composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The treatment composition may be in the form of a liquid. The liquid composition may preferably include from about 50% to about 97%, preferably from about 60% to about 96%, more preferably from about 70% to about 95%, or even from about 80% to about 95%, by weight of the fabric treatment composition, of water. The liquid composition may be a liquid fabric conditioner. The liquid may be packaged in a pourable bottle. The liquid may be packaged in an aerosol can or other spray bottle. Suitable containers are described in more detail below.

The treatment composition may be in the form of a solid. The composition may be in the form of a bead or pastille, which may be pastilled from a liquid melt. The composition may be an extruded product. The treatment composition may be in the form of a powder or granules.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The treatment composition may be in the form of a spray and may be dispensed, for example, from a bottle via a trigger sprayer and/or an aerosol container with a valve.

The treatment composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

The treatment compositions of the present disclosure may be characterized by a pH of from about 2 to about 12, or from about 2 to about 8.5, or from about 2 to about 7, or from about 2 to about 5. The treatment compositions of the present disclosure may have a pH of from about 2 to about 4, preferably a pH of from about 2 to about 3.7, more preferably a pH from about 2 to about 3.5, preferably in the form of an aqueous liquid. It is believed that such pH levels facilitate stability of the quaternary ammonium ester compound, when present. On the other hand, detergent compositions are typically characterized by a pH of from about 7 to about 12, preferably from about 7.5 to about 11. The pH of a composition is determined by dissolving/dispersing the composition in deionized water to form a solution at 10% concentration, at about 20° C.

Additional components and/or features of the compositions are discussed in more detail below.

Population of Delivery Particles

The treatment compositions of the present disclosure comprise a population of delivery particles. The delivery particles comprise a core and a shell surrounding the core. The core may comprise a benefit agent, and optionally a partitioning modifier. The core can be a liquid or a solid, preferably a liquid, at room temperature.

The treatment composition may comprise from about 0.05% to about 20%, or from about 0.05% to about 10%, or from about 0.1% to about 5%, or from about 0.2% to about 2%, by weight of the composition, of delivery particles. The composition may comprise a sufficient amount of delivery particles to provide from about 0.05% to about 10%, or from about 0.1% to about 5%, or from about 0.1% to about 2%, by weight of the composition, of the encapsulated benefit agent, which may preferably be perfume raw materials, to the composition. When discussing herein the amount or weight percentage of the delivery particles, it is meant the sum of the wall material and the core material.

The population of delivery particles according to the present disclosure may be characterized by a volume-weighted median particle size from about 1 to about 100 microns, preferably from about 10 to about 100 microns, preferably from about 15 to about 50 microns, more preferably from about 20 to about 40 microns, even more preferably from about 25 to about 35 microns. For certain compositions, it may be preferred that the population of delivery particles is characterized by a volume-weighted median particle size from about 1 to about 50 microns, preferably from about 5 to about 20 microns, more preferably from about 10 to about 15 microns. Different particle sizes are obtainable by controlling droplet size during emulsification.

The delivery particles may be characterized by a ratio of core to shell up to 99:1, or even 99.5:0.5, on the basis of weight. The shell may be present at a level of from about 1% to about 25%, preferably from about 1% to about 20%, preferably from about 1% to 15%, more preferably from about 5% to about 15%, even more preferably from about 10% to about 15%, even more preferably from about 10% to about 12%, by weight of the delivery particle. The shell may be present at a level of least 1%, preferably at least 3%, more preferably at least 5% by weight of the delivery particle. The shell may be present at a level of up to about 25%, preferably up to about 20%, more preferably up to about 15%, more preferably up to about 12%, by weight of the delivery particle.

The delivery particles may be cationic in nature, preferably cationic at a pH of 4.5. The delivery particles may be characterized by a zeta potential of at least 15 millivolts (mV) at a pH of 4.5. The delivery particles can be fashioned to have a zeta potential of at least 15 millivolts (mV) at a pH of 4.5, or even at least 40 mV at a pH of 4.5, or even at least 60 mV at a pH of 4.5. Polyurea capsules prepared with chitosan typically exhibit positive zeta potentials. Such capsules have improved deposition efficiency on fabrics. At higher pH, the particles may be able to be made nonionic or anionic.

The delivery particles of the present disclosure comprise a shell surrounding a core. (As used herein, "shell" and "wall" are used interchangeably with regard to the delivery particles, unless indicated otherwise.) The shell comprises a polymeric material. The polymeric material is the reaction product of chitosan and a cross-linking agent.

The chitosan may be characterized by a weight average molecular weight of from about 100 kDa to about 600 kDa. Preferably, the chitosan is characterized by a weight average molecular weight (Mw) of from about 100 kDa to about 500 kDa, preferably from about 100 kDa to about 400 kDa, more preferably from about 100 kDa to about 300 kDa, even more preferably from about 100 kDa to about 200 kDa. The method used to determine the chitosan's molecular weight and related parameters is provided in the Test Methods section below and uses gel permeation chromatograph with multi-angle light scatter and refractive index detection (GPC-MALS/RI) techniques. Selecting chitosan having the preferred weight average molecular weight can result in capsules having suitable shell formation and/or desirable processibility.

The chitosan preferred for use in the materials of the present disclosure is acid-treated chitosan. For example, chitosan (which, prior to acid treatment, may also be referred to as raw chitosan or parent chitosan) may preferably be treated at a pH of 6.5 or less with an acid for at least one hour, preferably from about one hour to about three hours, at a temperature of from about 25° C. to about 99° C., preferably from about 75° C. to about 95° C. The acid may be selected from a strong acid (such as hydrochloric acid), a weak acid (such as formic acid or acetic acid), or a mixture thereof. The chitosan may preferably be acid-treated at a pH of from 2 to 6.5, preferably a pH of from 3 to 6, even more preferably a pH of from 4 to 6.

The acid-treated chitosan can be formed by treating chitosan with a mixture of acids (c.g., a mixed-acid system). Preferably, the acid-treated chitosan results from treating chitosan with a mixture comprising a first acid and a second acid, where the first acid comprises a strong acid, and where the second acid comprises a weak acid. As described in more detail above, using the mixture of acids described herein is believed to provide adequately performing delivery particles while, for example, minimizing risks to the manufacturing equipment.

The chitosan is preferably treated with the mixture at a pH of 6.5 or less, preferably at a pH of less than 6.5, more preferably at a pH of from 3 to 6, and at a temperature of at least 25° C., preferably from about 25° C. to about 99° C., preferably from about 75° C. to about 95° C. Temperatures that are too low may result in incomplete reaction; temperatures that are too high may result in undesirable degradation of the chitosan.

Acid-treating the chitosan can advantageously reduce the viscosity of the chitosan solution; lower-viscosity mixtures can be easier to process and/or result in improved capsule formation. It may be desired to acid-treat the chitosan for at least one hour, preferably from about one hour to about three hours. It may be desired to treat the chitosan for a length of time to obtain a chitosan solution having a viscosity of not more than about 1500 cps, preferably not more than 500 cps.

Treating the chitosan according to the present disclosure enables a chitosan solution of 3%, preferably 3.5%, more preferably 4% or higher concentration, to achieve a surprising reduction in viscosity measured at the same concentration. Viscosity of such concentration chitosan is typically in the area of 4000 Centipoise (cP). Treated according to the process of the present disclosure, the acid-treated chitosan at the same concentration may display a viscosity reduction of 60%, or even exceeding 60%, to a viscosity of 1500 cP, or even to 1000 cP, or even to 500cP, at the same concentration. To illustrate, treated in accordance with the present disclosure, chitosan at a 3.5% concentration, typically having a starting viscosity 4000 cP, displays a viscosity reduction of 60% or even exceeding 60%, to a viscosity of 1500 cP, or even 1000 cP at the same concentration.

It has been found that it is advantageous to use certain relative amounts of each acid in the mixture. For example, the first acid and the second acid are preferably present in a normality ratio of from about 20:80 to about 80:20, preferably from about 35:65 to about 65:35. Without wishing to be bound by theory, it is believed that selecting the right ratio can result in delivery particles that are made efficiently, perform well, and/or minimize corrosion dangers.

The first acid may comprise, consist essentially of, or consist of a strong acid selected from the group consisting of hydrochloric acid, perchloric acid, nitric acid, sulfuric acid, and a mixture thereof, preferably hydrochloric acid.

The weak acid and/or the second acid may comprise, consist essentially of, or consist of a weak acid selected from the group consisting of formic acid, acetic acid, ascorbic acid, glutamic acid, lactic acid, maleic acid, malic acid, succinic acid, citric acid, acrylic acid, oxalic acid, tartaric acid, and a mixture thereof, preferably formic acid, acetic acid, and a mixture thereof.

The acids can be monoprotic, diprotic, or polyprotic. For the purposes of this disclosure, "polyprotic" includes "triprotic" acids. It is to be understood that diprotic or polyprotic acids will have more than one ionizable hydrogen, and therefore have a first or initial pKa and additional pKa values for the additional ionizable hydrogens respectively. For purposes hereof, the "first pKa" refers to the first or initial ionizable hydrogen when the acid is diprotic or polyprotic.

The first acid preferably has a first pKa of less than 1. The second acid preferably has a first pKa of from about 1 to about 5.5. Preferably, both are true, where the first acid has a first pKa of less than 1, and the second acid has a first pKa of from about 1 to about 5.5.

As described above, the acid-treated chitosan can be formed by treating chitosan with a weak acid. For reduced corrosion risk, it may be preferred that the chitosan used to make the delivery particle shells is treated only with weak acid. The weak acid may comprise a single weak acid, or it may comprise a mixture of weak acids. Suitable weak acids are described above.

Without wishing to be bound by theory, it is believed that the selection of weak acid can influence the ultimate shell formation and resulting performance of the delivery particles, at least in certain product matrices. For example, as shown in the Example section below, it is believed that chitosan treated with acetic acid can result in delivery particles that perform particularly well in a liquid fabric enhancer composition. Thus, the present disclosure relates to treatment compositions, for example treatment composition that are liquid fabric enhancer ("LFE") compositions, where the composition comprises a population of delivery particles formed from an acid-treated chitosan as described herein, where the acid-treated chitosan results from treating chitosan with an acid, wherein the acid comprises one or more weak acids and is free of a strong acid, wherein the chitosan is treated with the acid at a pH of 6.5 or less, and at a temperature of at least 25° C. Preferably, the weak acid in such cases comprises acetic acid, or even comprises only acetic acid. Such compositions may comprise conditioning actives, such as ester quats, which may be present in the composition at a level of from about 1% to about 35%, preferably from 2% to about 20%, by weight of the composition. Suitable conditioning actives are described in more detail below.

The chitosan may comprise anionically modified chitosan, cationically modified chitosan, or a combination thereof. Modifying the chitosan in an anionic and/or cationic fashion can change the character of the shell of the delivery particle, for example, by changing the surface charge and/or zeta potential, which can affect the deposition efficiency and/or formulation compatibility of the particles.

As mentioned above, the shell is a polymeric material that is the reaction product of the chitosan and a cross-linking agent. Preferably, the cross-linking agent comprises a polyisocyanate. Thus, the shell of the delivery particles may comprise a polyurea resin, wherein the polyurea resin comprises the reaction product of a polyisocyanate and a chitosan.

The polyisocyanate material useful in the present disclosure is to be understood for purposes hereof as isocyanate monomer, isocyanate oligomer, isocyanate prepolymer, or dimer or trimer of an aliphatic or aromatic isocyanate. By "polyisocyanate," it is intended to mean a material or compound that includes two or more isocyanate moieties. All such monomers, prepolymers, oligomers, or dimers or trimers of aliphatic or aromatic isocyanates are intended encompassed by the term "polyisocyanate" herein. The polyisocyanates useful in the present disclosure comprise isocyanate monomers, oligomers or prepolymers, or dimers or trimers thereof, having at least two isocyanate groups. Preferred cross-linking can be achieved with polyisocyanates having at least three functional groups.

Aromatic polyisocyanates may be preferred; however, aliphatic polyisocyanates and blends thereof may be useful. Aliphatic polyisocyanate is understood as a polyisocyanate which does not comprise any aromatic moiety. Aromatic polyisocyanate is understood as a polyisocyanate which comprises at least one aromatic moiety. The cross-linking agent may comprise a mixture of an aromatic polyisocyanate and an aliphatic polyisocyanate.

The polyisocyanate, when aromatic, can be, but is not limited to, methylene diphenyl isocyanate, toluene diisocyanate, tetramethylxylidene diisocyanate, polyisocyanurate of toluene diisocyanate (commercially available from Bayer under the tradename Desmodur® RC), trimethylol propane-adduct of toluene diisocyanate (commercially available from Bayer under the tradename Desmodur® L75), naphthalene-1,5-diisocyanate, phenylene diisocyanate, or trimethylol propane-adduct of xylylene diisocyanate (commercially available from Mitsui Chemicals under the tradename Takenate® D-110N).

Aliphatic polyisocyanates may include a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100).

Derivatives of polyisocyanates may include oligomers or polymers of isocyanate monomers. As a non-limiting example, the polyisocyanate may preferably comprise an oligomer or polymer of diphenylmethane diisocyanate (MDI), such as Mondur® MR-Light.

The polyisocyanate may preferably be selected from the group consisting of: a polyisocyanurate of toluene diisocyanate; a trimethylol propane adduct of toluene diisocyanate; a trimethylol propane adduct of xylylene diisocyanate; 2,2'-methylenediphenyl diisocyanate; 4,4'-methylenediphenyl diisocyanate; 2,4'- methylenediphenyl diisocyanate; [diisocyanato(phenyl)methyl]benzene; toluene diisocyanate; tetramethylxylidene diisocyanate; naphthalene-1,5-diisocyanate; 1,4-phenylene diisocyanate; 1,3-diisocyanatobenzene; derivatives thereof (such as pre-polymers, oligomers, and/or polymers thereof); and combinations thereof.

The particle shell may also be reinforced using additional co-crosslinkers such as multifunctional amines and/or polyamines, such as diethylene triamine (DETA), polyethylene imine, polyvinyl amine, or mixtures thereof. Acrylates may also be used as additional co-crosslinkers, for example to reinforce the shell.

The polymeric material may be formed in a reaction, where the weight ratio of the chitosan present in the reaction to the cross-linker present in the reaction is from about 1:10 to about 1:0.1. It is believed that selecting desirable ratios of the biopolymer to the cross-linking agent can provide desired ductility benefits, as well as improved biodegradability. It may be preferred that at least 21 wt % of the shell is comprised of moieties derived from chitosan, preferably from acid-treated chitosan. Chitosan as a percentage by weight of the shell may be from about 21% up to about 95% of the shell. The ratio of chitosan in the water phase as compared to the isocyanate in the oil phase may be, based on weight, from 21:79 to 90:10, or even from 1:2 to 10:1, or even from 1:1 to 7:1. The shell may comprise chitosan at a level of 21 wt % or even greater, preferably from about 21 wt % to about 90 wt %, or even from 21 wt % to 85 wt %, or even 21 wt % to 75 wt %, or 21 wt % to 55 wt % of the total shell being chitosan. The chitosan of this paragraph may preferably be acid-treated chitosan.

The population of delivery particles may be made according to a process that comprises the following steps: (a) forming a water phase by treating the chitosan with a mixture of a first acid and a second acid, the first acid comprising a strong acid, and the second acid comprising a weak acid, wherein the chitosan is treated at a pH of 6.5 or less, or even less than pH 6.5, or even at a pH of from 3 to 6, and a temperature of at least 25° C. for at least one hour, preferably from one hour to three hours; (b) forming an oil phase comprising dissolving together at least one benefit agent and at least one cross-linking agent, preferably a polyisocyanate, optionally with an added oil (e.g., partitioning modifier) and/or solvent; (c) forming an emulsion by mixing under high shear agitation the water phase and the oil phase into an excess of the water phase, thereby forming droplets of the oil phase (which comprises the benefit agent) dispersed in the water phase, and optionally adjusting the pH of the emulsion to be in a range from pH 2 to pH 6; (d) curing the emulsion by heating to at least 40° C., for a time sufficient to form a shell at an interface of the droplets with the water phase, the shell comprising the reaction product of the cross-linking agent and the acid-treated chitosan, and the shell surrounding the core comprising the benefit agent.

Chitosan may be added into water in a jacketed reactor and at pH from 2 or even from 3 to 6.5, adjusted using a strong acid (such as concentrated HCl) and a weak acid (such as formic acid or acetic acid). The chitosan of this mixture may be acid-treated by heating to elevated temperature, such as 85° C. in 60 minutes, and then may be held at this temperature from 1 minute to 1440 minutes or longer. The water phase then may be cooled to 25° C. Optionally, deacetylating may also be further facilitated or enhanced by enzymes to depolymerize or deacetylate the chitosan. An oil phase may be prepared by dissolving an isocyanate such as trimers of xylylene Diisocyanate (XDI) or polymers of methylene diphenyl isocyanate (MDI), in oil at 25° C. Diluents, for example isopropyl myristate, may be used to adjust the hydrophobicity of the oil phase. The oil phase may then be added into the water phase and milled at high speed to obtain a targeted size. The emulsion may then be cured in one or more heating steps, such as heating to 40° C. in 30 minutes and holding at 40° C. for 60 minutes. Times and temperatures are approximate. The temperature and time are selected to be sufficient to form and cure a shell at the interface of the droplets of the oil phase with the water continuous phase. For example, the emulsion may be heated to 85° C. in 60 minutes and then held at 85° C. for 360 minutes to cure the particles. The slurry may then be cooled to room temperature.

The shell may degrade at least 50% after 20 days (or less) when tested according to test method OECD 301B. The shell may degrade at least 60% of its mass after 60 days (or less) when tested according to test method OECD 301B. The shell may preferably degrade at least 60% of its mass after 60 days (or less) when tested according to test method OECD 301B. The shell may degrade from 30-100%, preferably 40-100%, 50-100%, 60-100%, or 60-95%, in 60 days, preferably 50 days, more preferably 40 days, more preferably 28 days, more preferably 14 days.

The delivery particles of the present disclosure include a core. The core comprises a benefit agent. The core optionally comprises a partitioning modifier.

The core of a particle is surrounded by the shell. When the shell is ruptured, the benefit agent in the core is released. Additionally or alternatively, the benefit agent in the core may diffuse out of the particle, and/or it may be squeezed out. Suitable benefit agents located in the core may include benefit agents that provide benefits to a surface, such as a fabric or hair.

The core may comprise from about 5% to about 100%, by weight of the core, of a benefit agent, which may preferably comprise a fragrance. The core may comprise from about 45% to about 95%, preferably from about 50% to about 80%, more preferably from about 50% to about 70%, by weight of the core, of the benefit agent, which may preferably comprise a fragrance.

The benefit agent may comprise an aldehyde-comprising benefit agent, a ketone-comprising benefit agent, or a combination thereof. Such benefit agents, such as aldehyde- or ketone-containing perfume raw materials, are known to provide preferred benefits, such as freshness benefits. The benefit agent may comprise at least about 20%, preferably at least about 25%, more preferably at least about 40%, even more preferably at least about 50%, by weight of the benefit agent, of aldehyde-containing benefit agents, ketone-containing benefit agents, or combinations thereof.

The benefit agent may be a hydrophobic benefit agent. Such agents are compatible with the oil phases that are common in making the delivery particles of the present disclosure.

The benefit agent is selected so as to provide a benefit under preferred uses of the treatment composition. The benefit agent in the core may be selected from the group consisting of fragrance materials, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, synthetic or natural actives, antibacterial actives, antiperspirant actives, cationic polymers, dyes, and mixtures thereof.

The benefit agent in the core preferably comprises fragrance material (or simply "fragrance"), which may include one or more perfume raw materials. Fragrance is particularly suitable for encapsulation in the presently described delivery particles, as the fragrance-containing particles can provide freshness benefits across multiple touchpoints.

The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of logP, determined according to the test method below. Based on these characteristics, the PRMs may be categorized as Quadrant I, Quadrant II, Quadrant III, or Quadrant IV perfumes, as described in more detail in U.S. Pat. No. 6,869,923. Suitable Quadrant I, II, III, and IV perfume raw materials are disclosed therein.

Perfume raw materials having a boiling point B.P. lower than about 250° C. and a logP lower than about 3 are known as Quadrant I perfume raw materials. Quadrant I perfume raw materials are preferably limited to less than 30% of the fragrance material.

The fragrance may comprise perfume raw materials that have a logP of from about 2.5 to about 4. It is understood that other perfume raw materials may also be present in the fragrance.

The core of the delivery particles of the present disclosure may comprise a partitioning modifier, which may facilitate more robust shell formation. The partitioning modifier may be combined with the core's perfume oil material prior to incorporation of the wall-forming monomers. The partitioning modifier may be present in the core at a level of from 0% to 95%, preferably from about 5% to about 55%, preferably from about 10% to about 50%, more preferably from about 20% to about 50%, even more preferably from about 25% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described delivery particles.

Where the benefit agent is not itself sufficient to serve as the oil phase or solvent, particularly during the process of forming the shell of the delivery particles for the wall forming materials, the oil phase can comprise a suitable carrier and/or solvent. In this sense, the oil is optional, as the benefit agent itself can at times be the oil. These carriers or solvents are generally an oil, preferably have a boiling point greater than about 80° C. and low volatility and are nonflammable. Though not limited thereto, they preferably comprise one or more esters, preferably with chain lengths of up to 18 carbon atoms or even up to 42 carbon atoms and/or triglycerides such as the esters of C6 to C12 fatty acids and glycerol.

Optionally, the water phase may include an emulsifier. Non-limiting examples of emulsifiers include anionic surfactants (such as alkyl sulfates, alkyl ether sulfates, and/or alkyl benzenesulfonates), nonionic surfactants (such as alkoxylated alcohols, preferably comprising cthoxy groups), polyvinyl alcohol, and/or polyvinyl pyrrolidone. It may be that solubilized chitosan can provide emulsifying benefits in the present applications. Emulsifier, if employed, is typically from about 0.1 to 40% by weight, preferably 0.2 to about 15% by weight, more typically 0.5 to 10% be weight, based on total weight of the aqueous phase.

The population of delivery particles may be provided as a slurry, preferably an aqueous slurry. The slurry can include one or more processing aids, which may include water, aggregate inhibiting materials such as divalent salts, or particle suspending polymers such as xanthan gum, guar gum, cellulose (preferably microfibrillated cellulose) and/or carboxy methyl cellulose. When the delivery particles are characterized by a cationic nature (for example, when the shell is derived, at least in part, from chitosan), a non-anionic structurant, preferably a nonionic structurant, may be preferred, for example, to avoid detrimental charge interactions that may lead to undesirable aggregation.

The slurry can include one or more carriers selected from the group consisting of polar solvents, including but not limited to, water, ethylene glycol, propylene glycol, polyethylene glycol, glycerol; nonpolar solvents, including but not limited to, mineral oil, perfume raw materials, silicone oils, hydrocarbon paraffin oils; and mixtures thereof. Aqueous slurries may be preferred. The slurry may comprise non-encapsulated (of "free") perfume raw materials that are different in identity and/or amount from those that are encapsulated in the cores of the delivery particles.

The slurry may include a deposition aid that may comprise a polymer selected from the group comprising: polysaccharides, such as chitosan, cationically modified starch and/or cationically modified guar; polysiloxanes; poly diallyl dimethyl ammonium halides; copolymers of poly diallyl dimethyl ammonium chloride and polyvinyl pyrrolidone; a composition comprising polyethylene glycol and polyvinyl pyrrolidone; acrylamides; imidazoles; imidazolinium halides; polyvinyl amine; copolymers of poly vinyl amine and N-vinyl formamide; polyvinyl formamide, polyvinyl alcohol; polyvinyl alcohol crosslinked with boric acid; polyacrylic acid; polyglycerol ether silicone cross-polymers; polyacrylic acids, polyacrylates, copolymers of polyvinylamine and polvyinylalcohol oligomers of amines, in one aspect a diethylenetriamine, ethylene diamine, bis(3-aminopropyl)piperazine, N,N-Bis-(3-aminopropyl)methylamine, tris(2-aminoethyl)amine and mixtures thereof; polyethyleneimine, a derivatized polyethyleneimine, in one aspect an ethoxylated polyethyleneimine; a polymeric compound comprising, at least two moieties selected from the moicties consisting of a carboxylic acid moicty, an amine moicty, a hydroxyl moiety, and a nitrile moicty on a backbone of polybutadiene, polyisoprene, polybutadiene/styrene, polybutadiene/acrylonitrile, carboxyl-terminated polybutadiene/acrylonitrile or combinations thereof; pre-formed coacervates of anionic surfactants combined with cationic polymers; polyamines and mixtures thereof.

At least one population of delivery particles may be contained in an agglomerate and then combined with a distinct population of delivery particles and at least one adjunct material. Said agglomerate may comprise materials selected from the group consisting of silicas, citric acid, sodium carbonate, sodium sulfate, sodium chloride, and binders such as sodium silicates, modified celluloses, polyethylene glycols, polyacrylates, polyacrylic acids, zeolites and mixtures thereof.

Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders. Such equipment can be obtained from Lodige GmbH (Paderborn, Germany), Littleford Day, Inc. (Florence, Ky., U.S.A.), Forberg AS (Larvik, Norway), Glatt Ingenieurtechnik GmbH (Weimar, Germany), Niro (Soeborg, Denmark), Hosokawa Bepex Corp. (Minneapolis, Minn., U.S.A.), Arde Barinco (New Jersey, U.S.A.).

Adjunct Ingredient

The treatment compositions of the present disclosure may comprise one or more adjunct materials in addition to the delivery particles. The adjunct material may provide a benefit in the intended end-use of a composition, or it may be a processing and/or stability aid.

Suitable adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, coatings, formaldehyde scavengers, and/or pigments. Preferably, the adjunct materials comprise additional fabric conditioning agents, dyes, pH control agents, solvents, rheology modifiers, structurants, cationic polymers, surfactants, perfume, additional perfume delivery systems, chelants, antioxidants, preservatives, or mixtures thereof.

Depending on the intended form, formulation, and/or end-use, compositions of the present disclosure might not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers, and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

A. Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (c.g., sodium) or an amine (e.g., monoethanolamine). Due to the presence of cationic ester quat material, it may be desirable to limit the amount of anionic surfactant so as to avoid undesirable interactions of the materials; for example, the compositions may comprise less than 5%, preferably less than 3%, more preferably less than 1%, even more preferably less than 0.1%, by weight of the composition, of anionic surfactant.

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branhed alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12}$-14 dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

B. Conditioning Active

The compositions of the present disclosure may include a conditioning active.

Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof. Preferably the treatment composition is a fabric care composition where the one or more adjunct ingredients comprises quaternary ammonium ester material; such materials are particularly useful in fabric enhancing/conditioning/softening compositions.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

C. Deposition Aid

The compositions of the present disclosure may comprise a deposition aid. As described above, due to the synergistic benefits that flow from the ester quat material and the delivery particles of the present disclosure, relatively less (or even none) of a deposition aid may be require to provide comparable or even improved performance; alternatively, a deposition aid may be used in compositions of the present disclosure to boost performance even more.

Deposition aids can facilitate deposition of delivery particles, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with delivery particles (at the same time with, e.g., encapsulated benefit agents) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

D. Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the delivery particles as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Cross-linked polymers, such as cross-linked polyacrylate and/or polymers and/or co-polymers, such as those that further include nonionic monomers such as acrylamide or methacrylamide monomers, may be useful as structurants. Another suitable structurant is sold under the tradename Rheovis CDE, available from BASF.

E. Other Adjuncts

The treatment compositions of the present disclosure may contain other adjuncts that are suitable for inclusion in the product and/or for final usage. For example, the treatment compositions may comprise neat perfume, perfume delivery technologies (such as pro-perfumes and/or encapsulates having non-polyisocyanate/chitosan wall materials), cationic surfactants, cationic polymers, solvents, suds supressors, or combinations thereof.

Method of Making a Treatment Composition

The present disclosure further relates to methods for making a treatment composition, such as those treatment compositions and/or consumer product compositions described herein.

The method may comprise the steps of: providing a base composition, wherein the base composition comprises the treatment adjunct, and combining the population of delivery particles with the base composition. The population of delivery particles may preferably be provided as an aqueous slurry. The base composition is in the form of a liquid composition.

The delivery particles may be combined with the one or more adjunct ingredients when the delivery particles are in one or more forms, including a slurry form, neat particle form, and/or spray dried particle form, preferably slurry form. The delivery particles may be combined with such adjuncts by methods that include mixing and/or spraying.

At least a portion of the method of making a treatment composition may occur on manufacturing equipment that comprises stainless steel, preferably 316L stainless steel. The population of delivery particles may be part of an aqueous slurry that contacts at least a portion of the stainless steel, preferably 316L stainless steel. Because stainless steel is vulnerable to corrosion, for example in the presence chloride ions, it may be desirable to keep the amount of chloride ions to a minimum. Therefore, it may be preferred that the slurry comprises less than 0.4%, preferably less than or equal to 0.37%, preferably less than 0.2%, more preferably less than or equal to 0.17%, by weight of the slurry, of chloride ions (Cl⁻). Reducing the amount of HCl used and/or using a weak acid to treat the chitosan when forming delivery particles can reduce the relative amount of chloride ions.

The treatment compositions of the present disclosure can be formulated into any suitable form and prepared by any process chosen by the formulator. The one or more adjunct ingredients and the delivery particles may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

The treatment composition may be placed into a container to form a consumer product, as described herein. The container may be a bottle, preferably a plastic bottle. The treatment composition may be placed into an aerosol or other spray container according to known methods.

Method of Treatment

The present disclosure also relates to a method of treating a surface, preferably a fabric. In general, the method includes the step of contacting a surface, preferably a fabric, with a treatment composition according to the present disclosure, where the treatment composition includes a population of delivery particles as described herein.

Additionally or alternatively, the method may include the step of contacting a surface, preferably a fabric, with a population of delivery particles as described herein. The population of delivery particles may be contained in a treatment composition according to the present disclosure, preferably a fabric care composition.

The method may include the step of contacting a fabric, such as a garment, with a treatment composition. The treatment composition comprises a population of delivery particles. The contacting step results in one or more of the delivery particles being deposited on a surface of the fabric. The delivery particles comprise a core and a shell surrounding the core, where the core comprises a benefit agent, preferably a fragrance material that comprises one or more perfume raw materials. The shell comprises a polymeric material that is, for example, the reaction product of chitosan of a particular molecular weight and a cross-linking agent. Suitable treatment compositions and delivery particles are described in more detail above.

The contacting step may occur during a manual laundry process, for example in a wash basin as fabrics are treated by hand, or an automatic laundry process, for example in an automatic washing machine. The contacting step may occur during the wash cycle of an automatic washing machine; in such cases, the treatment composition may be a laundry detergent or a laundry additive. The contacting step may preferably occur during the rinse cycle of an automatic washing machine; in such cases, the treatment composition may be a fabric enhancer, preferably a liquid fabric enhancer. The contacting step may even occur during a drying step of a laundry process, for example in an automatic dryer machine; in such cases, the treatment composition may be in the form of a non-woven dryer sheet or a dryer bar. The contacting step may occur as a result of the treatment composition being directly applied to the fabric, for example in a pretreatment operation or in a "refreshing" step (e.g., for a fabric that has been used or worn since the last wash); in such cases, the treatment composition may be in the form of a liquid, a stick, or a spray, preferably a spray. Contacting the target fabrics relatively late in a laundering process, e.g., during a rinse cycle, improves the likelihood or efficiency of deposition onto the fabrics as they are less likely to be washed down the drain.

The contacting step may occur in the presence of water. The treatment composition may be diluted with water to form a treatment liquor. The treatment composition may be diluted from about 100-fold to about 1500-fold, preferably from 300-fold to about 1000-fold.

Liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, the water to fabric ratio may be typically from about 1:1 to about 30:1.

The dilution may occur in the drum of an automatic washing machine. The treatment composition may be placed into a dispensing drawer of an automatic washing machine. The treatment composition may be dispensed from the dispensing drawer to the drum during a treatment process.

As alluded to above, the method may further comprise a step of drying the fabric that has the one or more delivery particles on the surface of the fabric. The drying step may comprise a passive drying process, such as on a clothesline or drying rack. The drying step may comprise an automatic drying process, such as in an automatic dryer machine.

Combinations

Specifically contemplated combinations of the disclosure are herein described in the following lettered paragraphs. These combinations are intended to be illustrative in nature and are not intended to be limiting.

A. A treatment composition comprising a treatment adjunct and a population of delivery particles, wherein the delivery particles comprise a core and shell surrounding the core, wherein the core comprises a benefit agent, wherein the shell comprises a polymeric material that is the reaction product of an acid-treated chitosan and a cross-linking agent, wherein the acid-treated chitosan results from treating chitosan with a mixture of a first acid and a second acid, the first acid comprising a strong acid, the second acid comprising a weak acid, wherein the first acid and the second acid are present in a normality ratio of from about 20:80 to about 80:20, preferably from about 35:65 to about 65:35, wherein the chitosan is treated with the mixture at a pH of 6.5 or less, and at a temperature of at least 25° C.

B. The treatment composition according to paragraph A, wherein the first acid comprises a strong acid selected from the group consisting of hydrochloric acid, perchloric acid, nitric acid, sulfuric acid, and a mixture thereof, preferably hydrochloric acid.

C. The treatment composition according to any of paragraphs A or B, wherein the second acid comprises a weak acid selected from the group consisting of formic acid, acetic acid, ascorbic acid, glutamic acid, lactic acid, maleic acid, malic acid, succinic acid, citric acid, acrylic acid, oxalic acid, tartaric acid, and a mixture thereof, preferably formic acid, acetic acid, and a mixture thereof.

D. The treatment composition according to any of paragraphs A-C, wherein the first acid has a first pKa of less than 1, and the second acid has a first pKa of from about 1 to about 5.5.

E. The treatment composition according to any of paragraphs A-D, wherein the chitosan is characterized by a weight average molecular weight of from about 100 kDa to about 600 kDa, preferably from about 100 kDa to about 500 kDa, more preferably from about 100 kDa to about 400 kDa, more preferably from about 100 kDa to about 300 kDa, even more preferably from about 100 kDa to about 200 kDa.

F. The treatment composition according to any of paragraphs A-E, wherein the cross-linking agent comprises a polyisocyanate, preferably a polyisocyanate selected from the group consisting of: a polyisocyanurate of toluene diisocyanate; a trimethylol propane adduct of toluene diisocyanate; a trimethylol propane adduct of xylylene diisocyanate; 2,2'-methylenediphenyl diisocyanate; 4,4'-methylenediphenyl diisocyanate; 2,4'- methylenediphenyl diisocyanate; [diisocyanato(phenyl)methyl]benzene; toluene diisocyanate; tetramethylxylidene diisocyanate; naphthalene-1,5-diisocyanate; 1,4-phenylene diisocyanate; 1,3- diisocyanatobenzene; derivatives thereof (such as pre-polymers, oligomers, and/or polymers thereof); and combinations thereof.

G. The treatment composition according to any of paragraphs A-F, wherein the reaction product is formed in a reaction, wherein the weight ratio of the chitosan present in the reaction to the cross-linker present in the reaction is from about 1:10 to about 1:0.1.

H. The treatment composition according to any of paragraphs A-G, wherein the benefit agent is a fragrance material, preferably a fragrance material comprising perfume raw materials characterized by a logP of from about 2.5 to about 4.5.

I. The treatment composition according to any of paragraphs A-H, wherein the core further comprises a partitioning modifier, optionally present in the core at a level of from about 5% to about 55%, preferably from about 10% to about 50%, more preferably from about 25% to about 50%, by weight of the core, preferably a partitioning modifier selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof, more preferably isopropyl myristate.

J. The treatment composition according to any of paragraphs A-I, wherein the delivery particles are characterized by a volume-weighted median particle size from about 1 to about 100 microns, preferably from about 10 to about 100 microns, preferably from about 15 to about 50 microns, more preferably from about 20 to about 40 microns, even more preferably from about 25 to about 35 microns.

K. The treatment composition according to any of paragraphs A-J, wherein the delivery particles are obtainable from a process comprising the steps of: forming a water phase by treating the chitosan with the mixture of the first acid and the second acid, wherein the chitosan is treated at a pH of 6.5 or less, preferably at a pH of less than 6.5, more preferably pH of from 3 to 6, and at a temperature of at least 25° C., for at least one hour, thereby forming an acid-treated chitosan; forming an oil phase, the forming step comprising dissolving together at least one benefit agent and at least one cross-linking agent, preferably a polyisocyante, optionally with an added oil, preferably a partitioning modifier; forming an emulsion by mixing the oil phase into an excess of the water phase, preferably under high shear agitation, thereby forming droplets of the oil phase dispersed in the water phase, and optionally adjusting the pH of the emulsion to be in a range from pH 2 to pH 6; curing the emulsion at a temperature of at least 40° C. for a time sufficient to form a shell at an interface of the droplets with the water phase, the shell comprising the reaction product of the cross-linking agent and the acid-treated chitosan, and the shell surrounding the core comprising the droplets of the oil phase.

L. The treatment composition according to any of paragraphs A-K, wherein the delivery particles are cationic, preferably wherein the delivery particles are characterized by a zeta potential of at least 15 mV at a pH of 4.5.

M. The treatment composition according to any of paragraphs A-L, wherein the shells of the delivery particles degrade at least 60% in 60 days when tested according to test method OECD 301B.

N. The treatment composition according to any of paragraphs A-M, wherein the treatment adjunct is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

O. The treatment composition according to any of paragraphs A-N, wherein the treatment adjunct comprises anionic surfactant, a cationic conditioning agent, or a mixture thereof.

P. The treatment composition according to any of paragraphs A-O, wherein the treatment composition is a fabric care composition, a hard surface cleaner composition, a dish care composition, a hair care composition, a body cleansing composition, or a mixture thereof, preferably a fabric care composition, more preferably a fabric care composition that is a laundry detergent composition, a fabric conditioning composition, a laundry additive, a fabric pre-treat composition, a fabric refresher composition, or a mixture thereof.

Q. The treatment composition according to any of paragraphs A-P, wherein the treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof, preferably a liquid composition.

R. The treatment composition according to any of paragraphs A-Q, wherein the treatment composition comprises from about 50% to about 99%, by weight of the treatment composition, of water, preferably from about 60% to about 98%, more preferably from about 80% to about 96%, by weight of the treatment composition, of water.

S. A method of making a treatment composition according to any of paragraphs A-R, the method comprising the steps of: providing a base composition, wherein the base composition comprises the treatment adjunct, and combining the population of delivery particles with the base composition.

T. The method according to paragraph S, wherein the population of delivery particles is part of an aqueous slurry, wherein the slurry comprises less than 0.4%, preferably less than or equal to 0.37%, preferably less than 0.2%, more preferably less than or equal to 0.17%, by weight of the slurry, of chloride ions (Cl⁻).

U. The method according to any of paragraphs S or T, wherein the method occurs on manufacturing equipment that comprises 316L stainless steel, wherein the slurry contacts at least a portion of the 316L stainless steel.

V. A method of treating a surface, the method comprising the step of: contacting the surface, preferably a fabric, with a treatment composition according to any of paragraphs A-R.

W. A treatment composition comprising a treatment adjunct and a population of delivery particles, wherein the delivery particles comprise a core and shell surrounding the core, wherein the core comprises a benefit agent, wherein the shell comprises a polymeric material that is the reaction product of an acid-treated chitosan and a cross-linking agent, wherein the acid-treated chitosan results from treating chitosan with an acid, wherein the acid comprises one or more weak acids, wherein the chitosan is treated with the acid at a pH of 6.5 or less, and at a temperature of at least 25° C.; and wherein the treatment adjunct comprises a conditioning active.

X. The treatment composition according to paragraph W, wherein the acid is free of a strong acid.

Y. The treatment composition according to any of paragraphs W or X, wherein the weak acid is selected from the group consisting of formic acid, acetic acid, ascorbic acid, glutamic acid, lactic acid, maleic acid, malic acid, succinic acid, citric acid, acrylic acid, oxalic acid, tartaric acid, and a mixture thereof, preferably formic acid, acetic acid, and a mixture thereof, even more preferably acetic acid.

Test Methods

It is understood that the test methods disclosed in the Test Methods section of the present application should be used to determine the respective values of the parameters of Applicant's claimed subject matter as claimed and described herein.

Determination of a Polymer's Molecular Weight and Related Parameters

The following method describing gel permeation chromatograph with multi-angle light scatter and refractive index detection (GPC-MALS/RI) is used to find molecular weight distribution measurements and related values of the polymers described herein.

Gel Permeation Chromatography (GPC) with Multi-Angle Light Scattering (MALS) and Refractive Index (RI) Detection (GPC-MALS/RI) permits the measurement of absolute molecular weight of a polymer without the need for column calibration methods or standards. The GPC system allows molecules to be separated as a function of their molecular size. MALS and RI allow information to be obtained on the number average (Mn) and weight average (Mw) molecular weight.

The Mw distribution of water-soluble polymers like chitosan is typically measured by using a Liquid Chromatography system (e.g., Agilent 1260 Infinity pump system with OpenLab Chemstation software, Agilent Technology, Santa Clara, CA, USA) and a column set (e.g., 2 Tosoh TSKgel G6000WP 7.8×300 mm 13 um pore size, guard column A0022 6 mm×40 mm PW x1-cp, King of Prussia, PA) which is operated at 40° C. The mobile phase is 0.1M sodium nitrate in water containing 0.02% sodium azide and 0.2% acetic acid. The mobile phase solvent is pumped at a flow rate of 1 mL/min, isocratically. A multiangle light scattering (18-Angle MALS) detector DAWN® and a differential refractive index (RI) detector (Wyatt Technology of Santa Barbara, Calif., USA) controlled by Wyatt Astra® software v8.0 are used.

A sample is typically prepared by dissolving chitosan materials in the mobile phase at ~1 mg per ml and by mixing the solution for overnight hydration at room temperature. The sample is filtered through a 0.8 μm Versapor membrane filter (PALL, Life Sciences, NY, USA) into the LC autosampler vial using a 3-ml syringe before the GPC analysis.

A dn/dc value (differential change of refractive index with concentration, 0.15) is used for the number average molecular weight (Mn), weight average molecular weight (Mw), Z-average molecular weight (Mz), molecular weight of the peak maxima (Mp), and polydispersity (Mw/Mn) determination by the Astra detector software.

Viscosity

Viscosity of liquid finished product is measured using an AR 550 rheometer/viscometer from TA instruments (New Castle, DE, USA), using parallel steel plates of 40 mm diameter and a gap size of 500 μm. The high shear viscosity at 20 s$^{-1}$ and low shear viscosity at 0.05 s$^{-1}$ is obtained from a logarithmic shear rate sweep from 0.01 s$^{-1}$ to 25 s$^{-1}$ in 3 minutes time at 21° C.

Test Method for Determining logP

The value of the log of the Octanol/Water Partition Coefficient (logP) is computed for each material (e.g., each PRM in the perfume mixture) being tested. The logP of an individual material (e.g., a PRM) is calculated using the Consensus logP Computational Model, version 14.02 (Linux) available from Advanced Chemistry Development Inc. (ACD/Labs) (Toronto, Canada) to provide the unitless logP value. The ACD/Labs' Consensus logP Computational Model is part of the ACD/Labs model suite.

Volume-Weighted Particle Size and Size Distribution

The volume-weighted particle size distribution is determined via single-particle optical sensing (SPOS), also called optical particle counting (OPC), using the AccuSizer 780 AD instrument and the accompanying software CW788 version 1.82 (Particle Sizing Systems, Santa Barbara, California, U.S.A.), or equivalent. The instrument is configured with the following conditions and selections: Flow Rate=1 ml/sec; Lower Size Threshold=0.50 μm; Sensor Model Number=Sensor Model Number=LE400-05 or equivalent; Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at least 9200 per ml. During a time period of 60 seconds the suspension is analyzed. The resulting volume-weighted PSD data are plotted and recorded, and the values of the desired volume-weighted particle size (e.g., the median/50$^{th}$ percentile, 5$^{th}$ percentile, and/or 90$^{th}$ percentile) are determined.

Procedure for Determination of % Degradation

To determine % degradation, the procedure set forth in the "OECD Guideline for Testing of Chemicals" 301B CO$_2$ Evolution (Modified Sturm Test), adopted 17 Jul. 1992, is used. For ease of reference, this test method is referred to herein as test method OECD 301B.

Fabric Treatment Method

Miele washing machines were used to treat the fabrics. For each treatment, the washing machine was loaded with 3 kg fabric, comprising 1100 g knitted cotton fabric, 1100 g polyester-cotton fabrics (50/50). Additionally, 18 terry towel cotton tracers are also added, which weigh together about 780 g.

Prior to the test treatment, the load is preconditioned twice, each time using the 95° C. short cotton cycle with 79 g of unperfumed IEC A Base detergent (ex WFK Testgewebe GmbH), followed by two additional 95° C. washes without detergent.

For the test treatment, the load is washed using a 40° C. short cotton cycle, 1200 rpm spin speed with 79 g IEC A Base detergent, which is added at the start of the wash cycle in the appropriate dispenser. A dosage of 35 g of the test fabric treatment composition (i.e., LFE according to the examples) is added in the appropriate dispenser. At the end of the treatment cycle, the terry towel tracers are removed from the washing machine and line-dried overnight.

The next day, the dry terry towel tracers are analyzed by fast headspace GC/MS (gas chromatography mass spectrometry) approach, as described below. All treatments washed at the same day for comparative purpose and analyzed on the same day are reported as "one wash test."

Method of Olfactive Evaluation

After the fabrics have been treated, expert perfumers perform an olfactive assessment for on the dry fabrics perfume intensity at the DRY touchpoints (Dry Fabric Odor=DFO) and at a RUB touchpoint (Rubbed Fabric Odor=RFO). Fabrics are dried for one day, smelled for DFO, then manually manipulated by rubbing the fabric against itself and smelled again for RFO; the scores are averaged. Scores are based on a perfume odor intensity scale from 0 to 100, where 0=no perfume odor, 25=slight perfume odor, 50=moderate perfume odor, 75=strong perfume odor, and 100=extremely strong perfume odor.

Method to Determine Headspace Concentration Above Treated Dry Fabrics

The cotton tracers are analyzed by a fast headspace GC/MS (gas chromatography mass spectrometry) approach. 4×4 cm aliquots of the terry towel cotton tracers were transferred to 25 ml headspace vials. The fabric samples were equilibrated for 10 minutes@65° C. The headspace above the fabrics was sampled via SPME (50/30um DVB/Carboxen/PDMS) approach for 5 minutes. The SPME fiber was subsequently on-line thermally desorbed into the GC. The analytes were analyzed by fast GC/MS in full scan mode. Ion extraction of the specific masses of the PRMs was used to calculate the total HS response and perfume headspace composition above the tested legs.

EXAMPLES

The examples provided below are intended to be illustrative in nature and are not intended to be limiting.

Comparative Example 1

A water phase is prepared by dispersing 92.19 g chitosan (ULV grade, Primex EHF, Siglufjordur, Iceland) into 1956.6 g water while mixing in a jacketed reactor. The pH of the water phase is then adjusted to 5.37 using 39.16 g concentrated HCl (Hydrochloric acid, 32-38%, Avantor Performance Materials, LLC, Radnor, PA) under agitation. The water phase temperature is then increased to 95° C. over 90 minutes and then held at 95° C. for a period of time, such as 2 hours, to acid-treat the chitosan. The water phase temperature is then reduced to 25° C. after the acid-treatment step over a period of 90 minutes.

An oil phase is prepared by mixing 716.36 g perfume oil and 179.10 g isopropyl myristate (Acme-Hardesty Co., Bule Bell, PA) together along with 19.59 g Takenate D-110N (Mitsui Chemicals America, Inc., Rye Brook, NY) at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 28.84 micron.

Comparative Example 2

A water phase is prepared by dispersing 101.26 g chitosan (ULV grade, Primex EHF, Siglufjordur, Iceland) into 2153.18 g water while mixing in a jacketed reactor. 8.42 g concentrated HCl (Hydrochloric acid, 32-38%, Avantor Performance Materials, LLC, Radnor, PA) is then added to the chitosan mixture under agitation. The pH of the water phase is then adjusted to 5.43 using 16.26 g 90% formic acid (Brenntag Great Lakes, LLC, Wauwatosa, WI) under agitation. The water phase temperature is then increased to 95° C. over 90 minutes and then held at 95° C. for a period of time, such as 2 hours, to acid-treat the chitosan. The water phase temperature is then reduced to 25° C. after the acid-treatment step over a period of 90 minutes.

An oil phase is prepared by mixing 786.74 g perfume oil and 196.71 g isopropyl myristate (Acme-Hardesty Co., Bule Bell, PA) together along with 21.53 g Takenate D-110N (Mitsui Chemicals America, Inc., Rye Brook, NY) at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 26.26 micron.

Comparative Example 3

A water phase is prepared by dispersing 12.35 pounds chitosan (ULV grade, Primex EHF, Siglufjordur, Iceland) into 262.10 pounds water while mixing in a jacketed tank. The pH of the water phase is then adjusted to 5.19 using 2.7 pounds 90% formic acid (Brenntag Great Lakes, LLC, Wauwatosa, WI) under agitation. The water phase temperature is then increased to 95° C. over 90 minutes and then held at 95° C. for a period of time, such as 2 hours, to acid-treat the chitosan. The water phase temperature is then reduced to 25° C.after the acid-treatment step over a period of 90 minutes.

An oil phase is prepared by mixing 78.2 pounds perfume oil and 42 pounds isopropyl myristate (Acme-Hardesty Co., Bule Bell, PA) together along with 2.6 pounds Takenate D-110N (Mitsui Chemicals America, Inc., Rye Brook, NY) in a jacketed tank at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 32.11 micron.

Example 1

A water phase is prepared by dispersing 101.31 g chitosan (ULV grade, Primex EHF, Siglufjordur, Iceland) into 2149.03 g water while mixing in a jacketed reactor. 25.19 g concentrated HCl (Hydrochloric acid, 32-38%, Avantor Performance Materials, LLC, Radnor, PA) is then added to the chitosan mixture under agitation. The pH of the water phase is then adjusted to 5.43 using 8.5 g 90% formic acid (Brenntag Great Lakes, LLC, Wauwatosa, WI) under agitation. The water phase temperature is then increased to 95° C. over 90 minutes and then held at 95° C. for a period of time, such as 2 hours, to acid-treat the chitosan. The water phase temperature is then reduced to 25° C. after the acid-treatment step over a period of 90 minutes.

An oil phase is prepared by mixing 786.70 g perfume oil and 196.68 g isopropyl myristate (Acme-Hardesty Co., Bule Bell, PA) together along with 21.57 g Takenate D-110N (Mitsui Chemicals America, Inc., Rye Brook, NY) at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 25.65 micron.

Example 2

A water phase is prepared by dispersing 12.31 pounds chitosan (ULV grade, Primex EHF, Siglufjordur, Iceland) into 261.33 pounds water while mixing in a jacketed tank. 3.07 pounds of concentrated HCl (Hydrochloric acid, 32-38%, Avantor Performance Materials, LLC, Radnor, PA) is then added to the chitosan mixture under agitation. The pH of the water phase is then adjusted to 5.22 using 1.11 pounds 90% formic acid (Brenntag Great Lakes, LLC, Wauwatosa, WI) under agitation. The water phase temperature is then increased to 95° C. over 90 minutes and then held at 95° C. for a period of time, such as 2 hours, to acid-treat the chitosan. The water phase temperature is then reduced to 25° C. after the acid-treatment step over a period of 90 minutes.

An oil phase is prepared by mixing 95.68 pounds perfume oil and 23.92 pounds isopropyl myristate (Acme-Hardesty Co., Bule Bell, PA) together along with 2.62 pounds Takenate D-110N (Mitsui Chemicals America, Inc., Rye Brook, NY) in a jacketed tank at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 28.82 micron. According to 301B test, the percent degradability of the shell is 54.95% at 28 days.

Example 3

A water phase is prepared by dispersing 101.30 g chitosan (ULV grade, Primex EHF, Siglufjordur, Iceland) into 2148.95 g water while mixing in a jacketed reactor. 16.80 g concentrated HCl (Hydrochloric acid, 32-38%, Avantor Performance Materials, LLC, Radnor, PA) is then added to the chitosan mixture under agitation. The pH of the water phase is then adjusted to 5.43 using 12.44 g 90% formic acid (Brenntag Great Lakes, LLC, Wauwatosa, WI) under agitation. The water phase temperature is then increased to 95° C. over 90 minutes and then held at 95° C. for a period of time, such as 2 hours, to acid-treat the chitosan. The water phase temperature is then reduced to 25° C. after the acid-treatment step over a period of 90 minutes.

An oil phase is prepared by mixing 786.73 g perfume oil and 196.69 g isopropyl myristate (Acme-Hardesty Co., Bule Bell, PA) together along with 21.56 g Takenate D-110N (Mitsui Chemicals America, Inc., Rye Brook, NY) at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 26.57 micron.

Example 4

A water phase is prepared by dispersing 101.26 g chitosan (ULV grade, Primex EHF, Siglufjordur, Iceland) into 2149.6 g water while mixing in a jacketed reactor. 25.22 g concentrated HCl (Hydrochloric acid, 32-38%, Avantor Performance Materials, LLC, Radnor, PA) is then added to the chitosan mixture under agitation. The pH of the water phase is then adjusted to 5.45 using 24.34 g 40% acetic acid (Columbus Chemical Industries, Inc, Columbus, WI) under agitation. The water phase temperature is then increased to 95° C. over 90 minutes and then held at 95° C. for a period of time, such as 2 hours, to acid-treat the chitosan. The water phase temperature is then reduced to 25° C. after the acid-treatment step over a period of 90 minutes.

An oil phase is prepared by mixing 786.71 g perfume oil and 196.68 g isopropyl myristate (Acme-Hardesty Co., Bule Bell, PA) together along with 21.51 g Takenate D-110N (Mitsui Chemicals America, Inc., Rye Brook, NY) at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 30.93 micron.

Example 5

A water phase is prepared by dispersing 101.28 g chitosan (ULV grade, Primex EHF, Siglufjordur, Iceland) into 2139.74 g water while mixing in a jacketed reactor. 16.82 g concentrated HCl (Hydrochloric acid, 32-38%, Avantor Performance Materials, LLC, Radnor, PA) is then added to the chitosan mixture under agitation. The pH of the water phase is then adjusted to 5.45 using 36.78 g 40% acetic acid (Columbus Chemical Industries, Inc, Columbus, WI) under agitation. The water phase temperature is then increased to 95° C. over 90 minutes and then held at 95° C. for a period of time, such as 2 hours, to acid-treat the chitosan. The water phase temperature is then reduced to 25° C. after the acid-treatment step over a period of 90 minutes.

An oil phase is prepared by mixing 786.74 g perfume oil and 196.68 g isopropyl myristate (Acme-Hardesty Co., Bule Bell, PA) together along with 21.51 g Takenate D-110N (Mitsui Chemicals America, Inc., Rye Brook, NY) at room temperature. The oil phase is added to the water phase under high shear milling to obtain an emulsion. The emulsion is heated to 65° C. over 45 minutes and then heated to 85° C. over 60 minutes. The emulsion is then maintained at this temperature for 6 hours while mixing. The population of delivery particles of the final slurry has a volume weighted median particle size of 28.84 micron.

Example 6. Chitosan Treated with a Single Acid

To compare the performance of delivery particles made from chitosan material that has undergone various treatments with single acids, three populations of delivery particles are made.

Chitosan is treated with hydrochloric acid, formic acid, and acetic acid, respectively. Perfume delivery particles are made according to the present disclosure, where the shells are made from the acid-treated chitosan and cross-linked with polyisocyanate. The cores of the delivery particles include, on average, approximately 80% of a first perfume and approximately 20% of partitioning modifier (i.e., isopropyl myristate). The volume-weighted mean particle size of the particle populations is approximately from 12 to 14 microns.

To test the freshness performance of the resulting delivery particles, samples of liquid fabric enhancers ("LFE") are prepared with the different delivery particles described above. The test LFE compositions include about 6 wt % diester quat. The chitosan-based delivery particles are present in the test LFE compositions at a level so as to provide approximately 0.2% of encapsulated fragrance, by weight of the LFE composition. The pH of the test LFE compositions is adjusted to be approximately 3.

Fabrics are treated according to the Fabric Treatment method provided in the Test Methods section above. The fabrics are evaluated for Dry Fabric Odor (DFO) and Rubbed Fabric Odor (RFO) according to the method of olfactive evaluation provided in the Test methods section above. Results are provided below in Table 1.

Additionally, the delivery particles are provided to a heavy-duty liquid (HDL) detergent matrix and tested for leakage after one week of storage. Leakage percentages are provided in Table 1.

TABLE 1

| Leg | Acid (100%) | DFO Sensory | RFO Sensory | 1 Week Leakage % in HDL |
|---|---|---|---|---|
| A * | HCl | 42.1 | 46 | 16% |
| B | Formic | 41.6 | 44 | 31% |
| C | Acetic | 46.9 | 53 | 45% |

* = comparative example

As shown in Table 1, delivery particles made from chitosan treated with a weak acid, namely formic or acetic acid, provide comparable or even better freshness performance based on the olfactive assessment versus delivery particles made from chitosan treated with a strong acid, namely hydrochloric acid. It is also expected that the weak acids will lead to an improved corrosion profile for the related slurry.

Interestingly, acetic acid appears to provide an improved freshness performance compared to formic acid when the delivery particles are provided to an LFE product. However, as shown in Table 2, the particles made from the chitosan treated with acetic acid show a relatively worse leakage profile in an HDL product compared to the particles made from the formic-acid-treated chitosan. Additionally, it was noted that the slurry of particles made from the acetic-acid-treated chitosan showed some gelling, which may lead to processing challenges.

Example 7. Effect of Mixed Acid Treatments on Freshness Performance of Particles To compare the freshness performance of delivery particles made from chitosan material that has undergone various acid treatments, samples of liquid fabric enhancers ("LFE") are prepared with the different delivery particles described above.

For each trial, the cores of the delivery particles include, on average, approximately 65%-80% of a second perfume and approximately 20%-35% of partitioning modifier (i.e., isopropyl myristate).

Test LFE compositions having the general formula as provided in Table 2 are prepared. The chitosan-based delivery particles are present in the test LFE compositions at a level so as to provide approximately 0.2% of encapsulated fragrance, by weight of the LFE composition. The pH of the test LFE compositions is adjusted to be approximately 3.

TABLE 2

| Ingredient | % Active (w/w) |
|---|---|
| DiEster Quat [1] | 6% |
| Encapsulated perfume oil, provided in Chitosan-Based Delivery Particles | 0.2% |
| Formic Acid | 0.045% |
| Hydrochloric acid | 0.0075% |
| Sodium Hydroxyethane diphosphonic acid | 0.0071% |
| Structurant (cationic polymer) [2] | 0.11% |
| Antifoam (silicone) | 0.004% |
| Water | Balance |
| pH | Approx. 3 |

[1] N,N-di(tallowoyloxyethyl)-N,N-dimethylammonium chloride, ex Evonik
[2] Flosoft FS222, ex SNF Fabrics are treated according to the Fabric Treatment method provided in the Test Methods section above. The fabrics are evaluated for Dry Fabric Odor (DFO) and Rubbed Fabric Odor (RPO) according to the method of olfactive evaluation provided in the Test methods section above.

A. Formic Acid

Results for capsules made from chitosan treated, at least in part, with formic acid are provided in Table 3 below.

TABLE 3

| Leg | Particle Example | Acid normality ratio (HCl:formic) | DFO | RFO |
|---|---|---|---|---|
| A * | Comp. Ex. 1 | 100:0 | 51.2 | 55.0 |
| B | Ex. 1 (bench scale) | 56:44 | 47.4 | 52.1 |
| C | Ex. 2 (pilot plant scale) | 56:44 | 50.2 | 54.8 |
| D | Ex. 3 | 37:63 | 47.7 | 50.1 |
| E * | Comp. Ex. 2 | 17:83 | 34.8 | 35.9 |
| F * | Comp. Ex. 3 | 0:100 | 41.4 | 45.6 |

* = comparative examples

According to the data in Table 3, delivery particles formed from chitosan treated with a mixed acid system (e.g., strong: weak normality ratios from 80:20 to 20:80, where the weak acid is formic acid) provide comparable olfactory performance (e.g., RFO>50) versus delivery particles formed from chitosan treated solely with HCl. However, due to the presence of the weak acid, it is believed that such systems will be relatively less corrosive.

The data in Table 3 also indicate that delivery particles made from chitosan treated by an acid system having a relatively high amount (e.g., normality ratios of less than 20:80) of formic acid (a weak acid) result in relatively poor performance (e.g., RFO below 46).

B. Acetic Acid

Results for capsules made from chitosan treated, at least in part, with acetic acid are provided in Table 3 below.

TABLE 4

| Leg | Particle Example | Acid normality ratio (HCl:acetic) | DFO | RFO |
|---|---|---|---|---|
| A * | Comp. Ex. 1 | 100:0 | 51.2 | 55.0 |
| G | Ex. 4 | 57:43 | 51.8 | 56.6 |
| H | Ex. 5 | 37:63 | 54.5 | 59.8 |

* = comparative example

According to the data in Table 4, delivery particles formed from chitosan treated with a mixed acid system (e.g., strong:weak normality ratios from 80:20 to 20:80, where the weak acid is acetic acid) provide comparable or even improved olfactory performance (e.g., RFO>50) versus delivery particles formed from chitosan treated solely with HCl. However, due to the presence of the weak acid, it is believed that such systems will be relatively less corrosive.

Furthermore, in view of separate data collected by the Applicant, it is believed that delivery particles formed from chitosan treated with only acetic acid are suboptimal, for example in terms of leakage in a liquid detergent matrix. Therefore, it is believed that the presence of a certain minimum level of a strong acid such as HCl is desirable for performance reasons.

Example 8. Effects of Slurry Chloride Levels on Corrosion

The following test was run to examine the effects of chloride levels in a delivery particle slurry on corrosion of a stainless steel material commonly used in manufacturing equipment.

Chitosan is treated with formic acid and used to make perfume delivery particles according to the methods described in the present disclosure. Samples of the resulting particle slurry are doped with magnesium chloride (MgCl$_2$) in order to provide slurries having varying chloride levels.

Stainless steel coupons (grade=316L SS; size=3/4"×2"× 1/8", with a 120 grit sanded finish) are placed in a tray at about 38° C. and are subjected to wet/dry testing, which includes periodically wetting the coupons with the slurry samples over the course of twenty-eight days (i.e., dipped on the first day, then every seven days). At the end of the treatment, the coupons are inspected for pitting due to corrosion. The total number of pits on the front and back of the coupons are counted and are reported in Table 5 below.

TABLE 5

| Leg | Chloride wt % in Slurry | Total No. of Pits |
| --- | --- | --- |
| I * | 0.64% | 8 |
| J * | 0.49% | 8 |
| K | 0.37% | 2 |
| L | 0.17% | 0 |

* = comparative example

As shown in Table 5, relatively lower amounts of chloride ions in the slurry result in fewer pits, indicating less corrosion. According to the data in Table 5, slurries having chloride levels less than 0.4% are preferred, with levels less than 0.2% being even more preferred.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A treatment composition comprising a treatment adjunct and a population of delivery particles,
    wherein the delivery particles comprise a core and shell surrounding the core,
    wherein the core comprises a benefit agent,
    wherein the benefit agent comprises a fragrance material,
    wherein the shell consists of a polymeric material that is a reaction product of an acid-treated chitosan and at least one cross-linking agent,
        wherein the acid-treated chitosan results from treating chitosan with a mixture of a first acid and a second acid,
        the first acid is a strong acid,
        the second acid is a weak acid,
        wherein the first acid and the second acid are present in a normality ratio of from about 35:65 to about 65:35,
        wherein the chitosan is treated with the mixture at a pH of 6.5 or less, and at a temperature of at least 25° C.,
    wherein the at least one cross-linking agent is polyisocyanate, and
    wherein the treatment adjunct comprises a conditioning active.

2. The treatment composition according to claim 1, wherein the first acid is selected from the group consisting of hydrochloric acid, perchloric acid, nitric acid, sulfuric acid, and a mixture thereof.

3. The treatment composition according to claim 1, wherein the second acid is selected from the group consisting of formic acid, acetic acid, ascorbic acid, glutamic acid, lactic acid, maleic acid, malic acid, succinic acid, citric acid, acrylic acid, oxalic acid, tartaric acid, and a mixture thereof.

4. The treatment composition according to claim 1, wherein the first acid has a first pKa of less than 1, and the second acid has a first pKa of from about 1 to about 5.5.

5. The treatment composition according to claim 1, wherein the chitosan is characterized by a weight average molecular weight of from about 100 kDa to about 600 kDa.

6. The treatment composition according to claim 1, wherein the reaction product is formed in a reaction, wherein the weight ratio of the chitosan present in the reaction to the cross-linker present in the reaction is from about 1:10 to about 1:0.1.

7. The treatment composition according to claim 1, wherein the fragrance material comprises perfume raw materials characterized by a logP of from about 2.5 to about 4.5.

8. The treatment composition according to claim 1, wherein the core further comprises a partitioning modifier.

9. The treatment composition according to claim 1, wherein the delivery particles are characterized by a volume-weighted median particle size from about 1 to about 100 microns.

10. The treatment composition according to claim 1, wherein the delivery particles are obtainable from a process comprising the steps of:

forming a water phase by treating the chitosan with the mixture of the first acid and the second acid, wherein the chitosan is treated at a pH of 6.5 or less, and at a temperature of at least 25° C., for at least one hour, thereby forming an acid-treated chitosan;

forming an oil phase, the forming step comprising dissolving together the benefit agent and the at least one cross-linking agent;

forming an emulsion by mixing the oil phase into an excess of the water phase, thereby forming droplets of the oil phase dispersed in the water phase, and optionally adjusting the pH of the emulsion to be in a range from pH 2 to pH 6;

curing the emulsion at a temperature of at least 40° C. for a time sufficient to form a shell at an interface of the droplets with the water phase, the shell consisting of the reaction product of the at least one cross-linking agent and the acid-treated chitosan, and the shell surrounding the core comprising the droplets of the oil phase.

11. The treatment composition according to claim 1, wherein the delivery particles are cationic and characterized by a zeta potential of at least 15 mV at a pH of 4.5.

12. The treatment composition according to claim 1, wherein the shells of the delivery particles degrade at least 60% in 60 days when tested according to test method OECD 301B.

13. The treatment composition according to claim 1, wherein the treatment adjunct further cmprises surfactants, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, or mixtures thereof.

14. The treatment composition according to claim 1, wherein the treatment adjunct further comprises anionic surfactant, a cationic conditioning agent, or a mixture thereof.

\* \* \* \* \*